US009001465B1

(12) United States Patent
Shimizu et al.

(10) Patent No.: US 9,001,465 B1
(45) Date of Patent: Apr. 7, 2015

(54) MICROWAVE-ASSISTED MAGNETIC RECORDING HEAD

(71) Applicant: HGST Netherlands B.V., Amsterdam (NL)

(72) Inventors: Junichiro Shimizu, Fujisawa (JP); Masukaza Igarashi, Kawagoe (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/254,823

(22) Filed: Apr. 16, 2014

(51) Int. Cl.
*G11B 5/31* (2006.01)
*G11B 5/53* (2006.01)

(52) U.S. Cl.
CPC .................................... *G11B 5/53* (2013.01)

(58) Field of Classification Search
USPC ...................................................... 360/125.3
See application file for complete search history.

(56) References Cited

U.S. PATENT DOCUMENTS

| | | | |
|---|---|---|---|
| 7,982,996 B2 | 7/2011 | Smith et al. | |
| 8,456,967 B1 | 6/2013 | Mallary | |
| 8,477,453 B2 * | 7/2013 | Takano et al. | 360/125.14 |
| 8,498,079 B1 * | 7/2013 | Song et al. | 360/125.3 |
| 8,824,102 B2 * | 9/2014 | Sasaki et al. | 360/125.24 |
| 8,842,390 B2 * | 9/2014 | Shen et al. | 360/125.3 |
| 2007/0159719 A1 * | 7/2007 | Yamakawa et al. | 360/126 |
| 2011/0090603 A1 | 4/2011 | Bai | |
| 2011/0216447 A1 | 9/2011 | Li et al. | |
| 2013/0063837 A1 | 3/2013 | Udo et al. | |
| 2013/0215530 A1 | 8/2013 | Igarashi et al. | |
| 2014/0009853 A1 * | 1/2014 | Shirotori et al. | 360/319 |
| 2014/0313616 A1 * | 10/2014 | Kusukawa et al. | 360/125.03 |

OTHER PUBLICATIONS

Masato Matsubara et al. "Experimental Feasibility of Spin-Torque Oscillator with Synthetic Field Generation Layer for Microwave Assisted Magnetic Recording"; AIP Journal of Applied Physics; Proceeding of the 55th Annual Conference on Magnetism and Magnetic Materials; vol. 109, Issue 7; Oct. 2010.

* cited by examiner

*Primary Examiner* — Allen T Cao
(74) *Attorney, Agent, or Firm* — Patterson & Sheridan, LLP

(57) ABSTRACT

Embodiments of the present invention generally relate to a MAMR head. The MAMR head includes an STO. The STO has a first surface at a media facing surface, a second surface that is opposite the first surface and a third surface adjacent to the first and second surfaces. The first and third surfaces form a first acute angle and the second and third surfaces form a second acute angle, where the second acute angle is less than or equal to the first acute angle. Having this configuration, the electrical current going through the STO is substantially perpendicular to the STO, which causes the spin torque to be maximized.

20 Claims, 8 Drawing Sheets

MICROWAVE-ASSISTED MAGNETIC RECORDING HEAD

BACKGROUND

1. Field

Embodiments disclosed herein generally relate to a magnetic disk device employing a microwave assisted magnetic recording head.

2. Description of the Related Art

Over the past few years, microwave assisted magnetic recording (MAMR) has been studied as a recording method to improve the areal density of a magnetic read/write device, such as a hard disk drive (HDD). MAMR enabled magnetic recording heads utilize a spin torque oscillator (STO) for generating a microwave (high frequency AC magnetic field). When the magnetic field from the write head is applied and current is conducted to the STO, the STO oscillates and may provide an AC magnetic field to the medium. The AC magnetic field may reduce the coercive force of the recording medium, thus high quality recording by MAMR may be achieved. Typically the STO includes a reference layer, a field generation layer (FGL) and an interlayer disposed between the reference layer and the FGL. The interlayer may be a non-magnetic layer having low electrical resistance, thus, the current flowing to the STO also flows in the in-plane direction within the interlayer.

The STO may be fabricated by laminating integrally with the MAMR head, and may be formed near the trailing side of a main pole. To increase the recording magnetic field, a tapered write pole (TWP) type main pole with a trailing edge taper (TET) configuration may be utilized and the STO may be formed near TET configuration in a TWP type main pole. In this configuration, the STO may not be perpendicular to a media facing surface (MFS), such as an air bearing surface (ABS). Because the current flowing to the STO tends to be parallel to the ABS, the current flowing to the STO is not perpendicular to the STO, which causes the spin torque to decrease. Therefore, an improved STO structure is needed.

SUMMARY

Embodiments disclosed herein generally relate to a MAMR head. The MAMR head includes an STO. The STO has a first surface at a media facing surface, a second surface that is opposite the first surface and a third surface adjacent to the first and second surfaces. The first and third surfaces form a first acute angle and the second and third surfaces form a second acute angle, where the second acute angle is less than or equal to the first acute angle. Having this configuration, the electrical current going through the STO is substantially perpendicular to the STO, which causes the spin torque to be maximized.

In one embodiment, a MAMR head is disclosed. The MAMR head includes an STO. The STO includes a first surface at a MFS, a second surface opposite the first surface, and a third surface adjacent to the first and second surfaces. The third surface and the first surface form a first acute angle and the third surface and the second surface form a second acute angle. The second acute angle is less than or equal to the first acute angle.

In another embodiment, a MAMR head is disclosed. The MAMR head includes an STO. The STO includes a reference layer having a first surface at a MFS, a second surface opposite the first surface, and a third surface adjacent to the first and second surfaces, where the first surface and the third surface forms a first angle. The STO further includes an interlayer having a fourth surface at the MFS and a fifth surface opposite the fourth surface, and a field generation layer disposed adjacent to the interlayer, where the field generation layer has a sixth surface disposed at the MSF and a seventh surface opposite the fifth surface. The second, fifth and seventh surfaces together have a curvature.

In another embodiment, a hard disk drive is disclosed. The hard disk drive includes a magnetic media, a magnetic read head, and a magnetic write head. The magnetic read head and the magnetic write head include a MFS and the magnetic write head further includes an STO. The STO has a first surface at the MFS, a second surface opposite the first surface, and a third surface adjacent to the first and second surfaces. The third surface and the first surface form a first acute angle and the third surface and the second surface form a second acute angle. The second acute angle is less than or equal to the first acute angle.

BRIEF DESCRIPTION OF THE DRAWINGS

So that the manner in which the above recited features can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments disclosed herein generally relate to a MAMR head. The MAMR head includes an STO. The STO has a first surface at a media facing surface, a second surface that is opposite the first surface and a third surface adjacent to the first and second surfaces. The first and third surfaces form a first acute angle and the second and third surfaces form a second acute angle, where the second acute angle is less than or equal to the first acute angle. Having this configuration, the electrical current going through the STO is substantially perpendicular to the STO, which causes the spin torque to be maximized.

Figure 1:
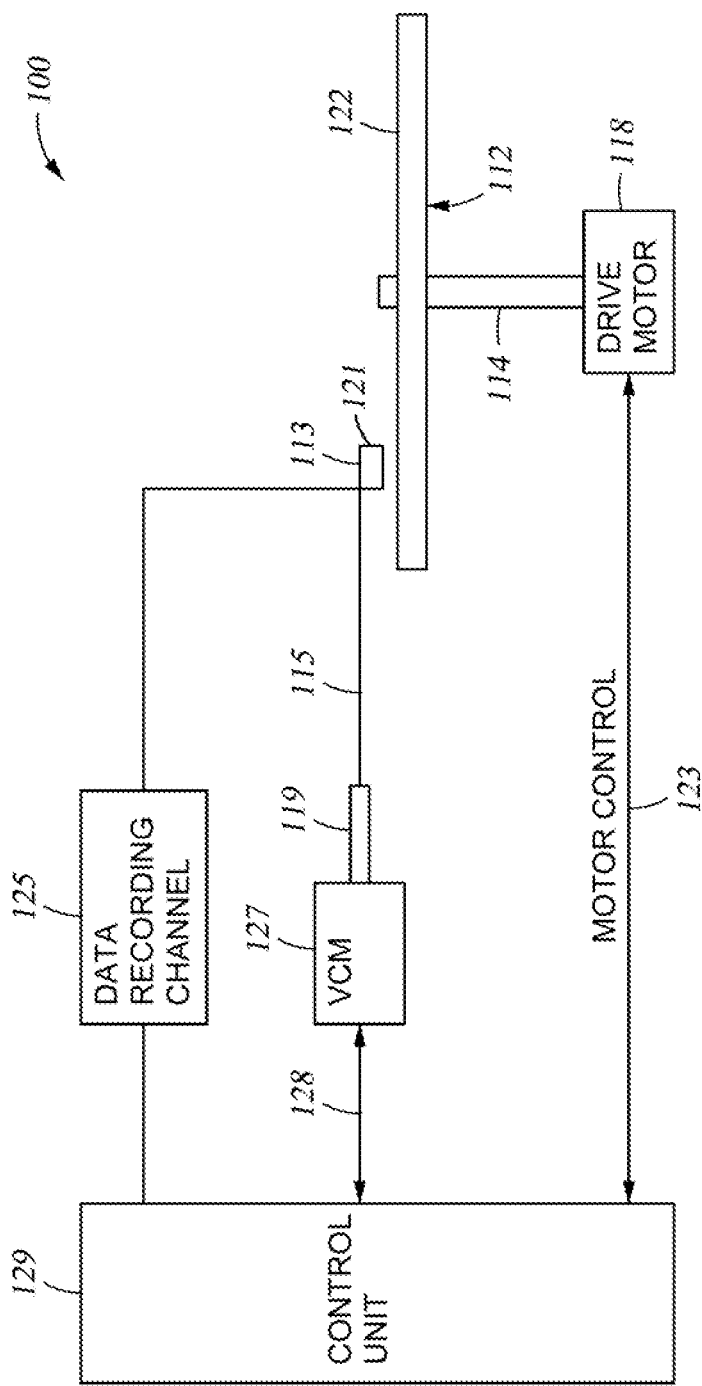
FIG. 1 illustrates a disk drive system, according to embodiments described herein.

FIG. 1 illustrates a disk drive 100 embodying this invention. As shown, at least one rotatable magnetic media, such as a magnetic disk 112, is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include an STO for applying an AC magnetic field to the disk surface 122. As the magnetic disk rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation of the MAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2A:
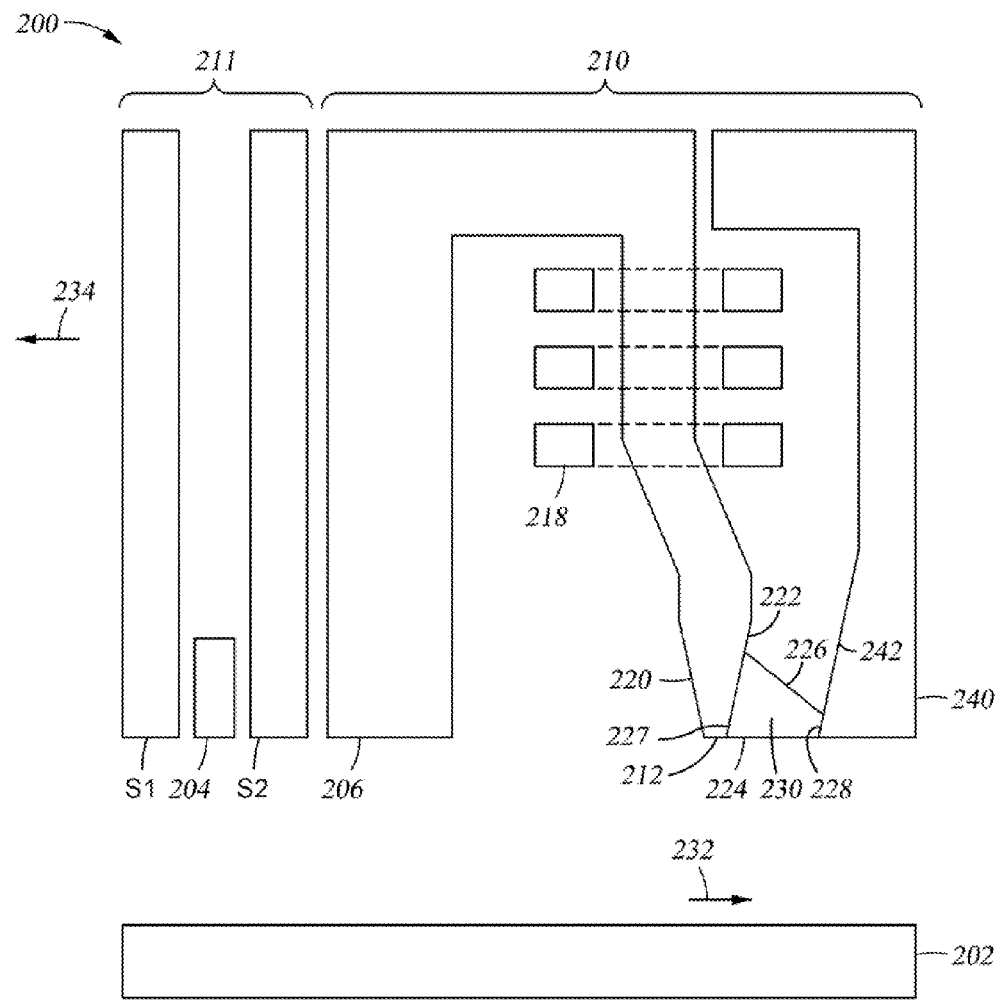
FIGS. 2A-2B are cross sectional views of a MAMR read/write head and magnetic disk of the disk drive system of FIG. 1, according to one embodiment described herein.

FIG. 2A is a fragmented, cross sectional side view through the center of a MAMR read/write head 200 facing a magnetic disk 202. The read/write head 200 and magnetic disk 202 may correspond to the magnetic head assembly 121 and magnetic disk 112, respectively, in FIG. 1. The read/write head 200 includes a media facing surface 212, such as an ABS, a magnetic write head 210 and a magnetic read head 211, and is mounted such that the ABS is facing the magnetic disk 202. In FIG. 2A, the disk 202 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 202 are detectable by the MR (or MTJ) sensing element 204 as the recorded bits.

The write head 210 includes a return pole 206, a main pole 220, a trailing shield 240, an STO 230 disposed between the main pole 220 and the trailing shield 240, and a coil 218 that excites the main pole 220. A trailing gap (not shown) and a leading gap (not shown) may be in contact with the main pole and a leading shield (not shown) may be in contact with the leading gap. The trailing and leading gaps and the leading shield are described in detail in FIGS. 5A-5C. A recording magnetic field is generated from the main pole 220 and the trailing shield 240 helps making the magnetic field gradient of the main pole 220 steep. The main pole 220 may be a magnetic material such as a CoFe alloy. The main pole 220 may be a TWP type main pole having a tapered trailing surface 222. The trailing shield 240 may have a leading surface 242 facing the trailing surface 222, and the leading surface 242 may be parallel to the trailing surface 222. In one embodiment, the main pole 220 has a saturated magnetization (Ms) of 2.4 T and a thickness of about 300 nanometers (nm). The trailing shield 240 may be a magnetic material such as NiFe alloy. In one embodiment, the trailing shield 240 has an Ms of about 1.2 T.

Figure 2B:
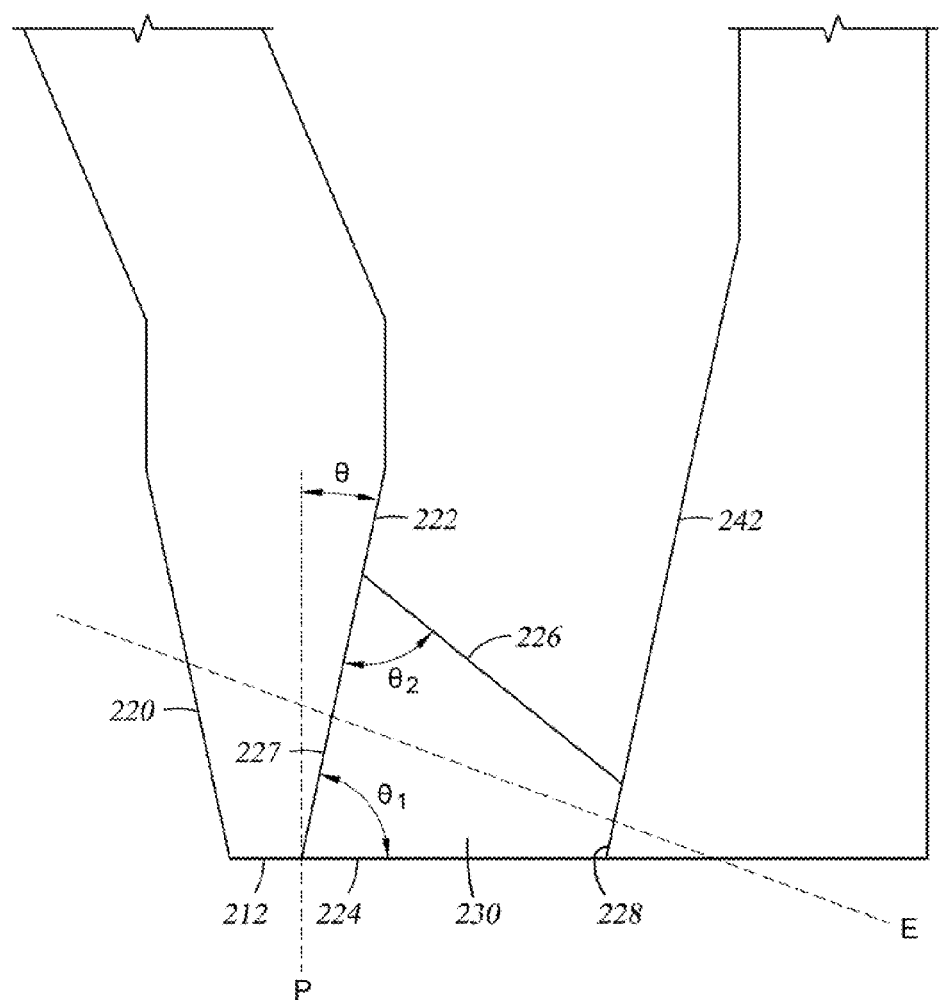

FIG. 2B is an enlarged view of the write head 210 at the media facing surface 212. The STO 230 may have a first surface 224 at the media facing surface 212, a second surface 226 that is opposite the first surface 224, a third surface 227 adjacent to the first surface 224 and the second surface 226, and a fourth surface 228 that is opposite the third surface 227. The tapered trailing surface 222 of the main pole 220 is not perpendicular to the media facing surface 212, and forms an angle θ with respect to a plane "P" which is perpendicular to the media facing surface 212. The third surface 227 of the STO 230 may be in contact with or parallel to the trailing surface 222 of the main pole 220. An angle $\theta_1$ may be formed between the third surface 227 and the first surface 224, and the angle $\theta_1$ plus the angle θ may be equal to 90 degrees. Thus, both angles θ and $\theta_1$ are acute angles. In order to maximize the spin torque, the electrical current flowing to the STO 230 may be substantially perpendicular to the STO 230, indicated as arrow "E," which is achieved by limiting the angle $\theta_2$, which is the angle between the third surface 227 and the second surface 226, to be less than or equal to $\theta_1$. The angle $\theta_2$ is also an acute angle. The effect of having $\theta_2$ less than or equal to $\theta_1$ is illustrated in FIGS. 3A-3B.

Figure 3A:
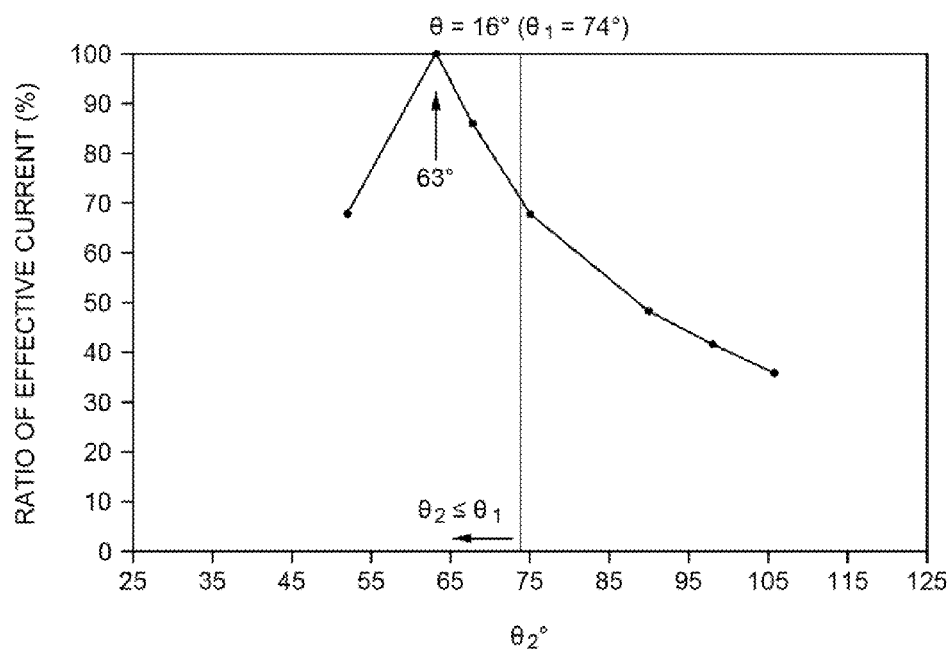
FIGS. 3A-3B are charts illustrating relationships between ratio of effective current and angle $\theta_2$, according to various embodiments described herein.
Figure 3B:
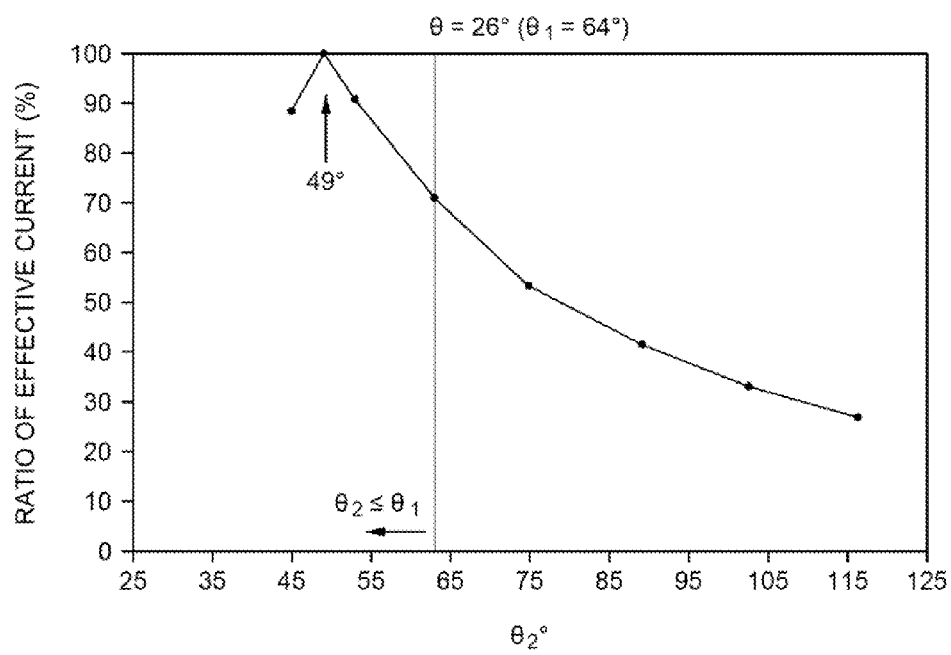

FIGS. 3A-3B are charts illustrating relationships between ratio of effective current and $\theta_2$. In one embodiment, θ is equal to 16 degrees, $\theta_1$ is equal to 74 degrees, and $\theta_2$ is plotted against the ratio of effective current in percentages. As shown in FIG. 3A, when $\theta_2$ is less than or equal to $\theta_1$, which is 74 degrees, the ratio of effective current is greater than about 68 percent. When $\theta_2$ is about 63 degrees, the ratio of effective current is at about 100 percent. It is worth noting that when $\theta_2$ is greater than or equal to 90 degrees, the ratio of effective current is less than about 48 percent.

In one embodiment, $\theta$ is equal to 26 degrees, $\theta_1$ is equal to 64 degrees, and $\theta_2$ is plotted against the ratio of effective current in percentages. As shown in FIG. 3B, when $\theta_2$ is less than or equal to $\theta_1$, which is 64 degrees, the ratio of effective current is greater than about 70 percent. When $\theta_2$ is about 49 degrees, the ratio of effective current is at about 100 percent. It is worth noting that when $\theta_2$ is greater than or equal to 90 degrees, the ratio of effective current is less than about 42 percent.

Figure 4A:
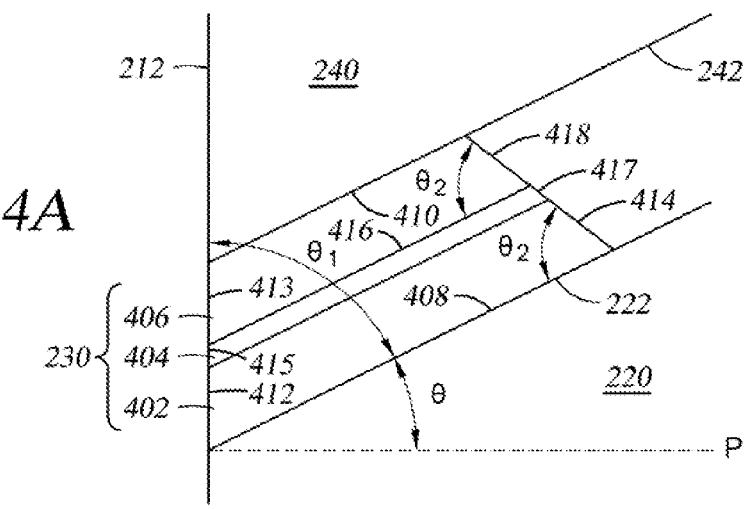
FIGS. 4A-4C are cross sectional views of an STO according to one embodiment described herein.
Figure 4B:
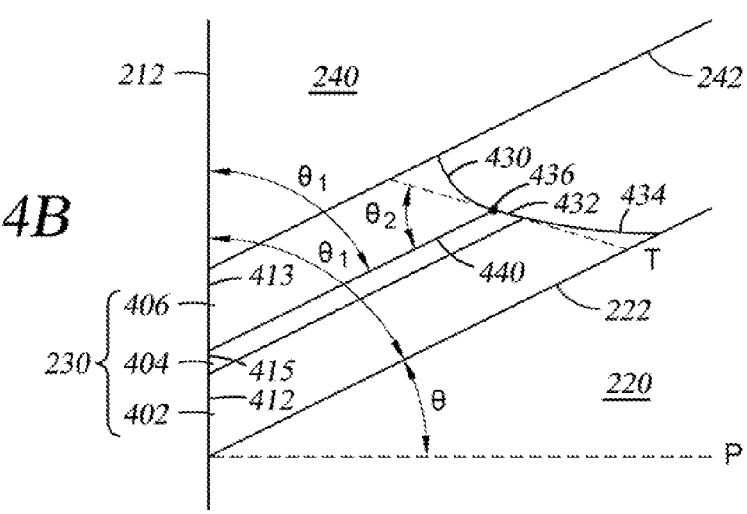
Figure 4C:
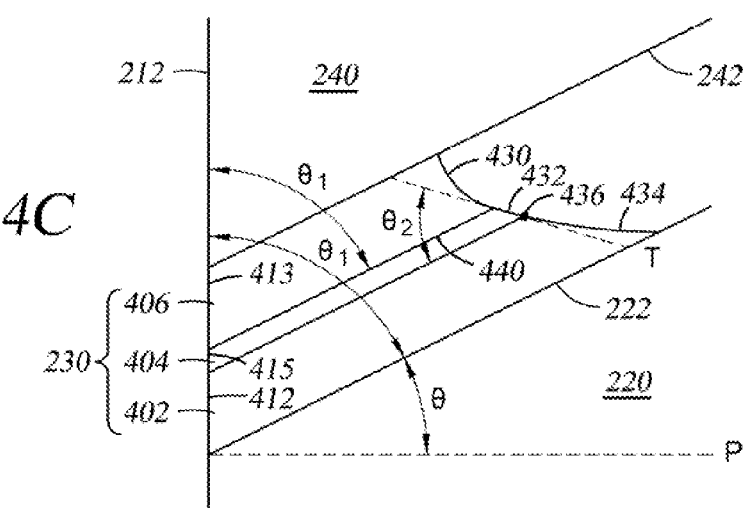

FIGS. 4A-4C are cross sectional side view of the STO 230 according to various embodiments. As shown in FIG. 4A, the STO 230 is disposed over the main pole 220 and the trailing shield 240 is disposed over the STO 230. The STO 230 has a trapezoidal shape and includes a first layer 402, a second layer 404 and a third layer 406. In one embodiment, the first layer 402 is the reference layer, the second layer 404 is the interlayer and the third layer 406 is the FGL. In another embodiment, the first layer 402 is the FGL layer, the second layer 404 is the interlayer and the third layer 406 is the reference layer. The first layer 402 and the third layer 406 may be made of a magnetic material such as cobalt and/or nickel containing material. The second layer 404 may be copper. The first layer 402 may be disposed next to the main pole 220 and the third layer 406 may be disposed next to the trailing shield 240. The first layer 402 has a surface 408 in contact with or parallel to the trailing surface 222 of the main pole 220, and the surface 408 may be the surface 227 shown in FIG. 2. The third layer 406 has a surface 410 in contact with or parallel to the leading surface 242 of the trailing shield 240, and the surface 410 may be the surface 228 shown in FIG. 2. The surfaces 408, 410 may be parallel to each other, and the surface 410 is disposed over the surface 408. The first, second and third layers 402, 404, 406, each includes a surface 412, 415 and 413 at the media facing surface 212, respectively, and the surfaces 412, 415 and 413 may be coplanar. Again the trailing surface 222 forms the angle $\theta$ with the plane "P" and the angle $\theta_1$ is formed between the surface 408 and the surface 412, where $\theta$ plus $\theta_1$ is equal to 90 degrees. The first, second and third layers 402, 404, 406, each includes a surface 414, 417 and 418 that is opposite the surface 412, 415 and 413, respectively, and the surfaces 414, 417 and 418 may be coplanar. The angle $\theta_2$ may be formed between the surface 408 and the surface 414 of the first layer 402. The second layer 406 may have a surface 416 that is substantially parallel to the surfaces 408, 410, and the angle $\theta_2$ may be formed between the surface 416 and the surface 418.

FIG. 4B is a cross sectional view of the STO 230 according to one embodiment. As shown in FIG. 4B, the first layer 402 is a reference layer, the second layer 404 is an interlayer and the third layer 406 is an FGL. The layers 402, 404, 406 each has a surface 434, 432, 430, which are opposite the surfaces 412, 415, 413, respectively, and the surfaces 434, 432, 430 are not co-planar as a result of one or more removal processes for forming the STO 230. The surfaces 434, 432, 430 together may have a curvature. In this case the angle $\theta_2$ may be measured by forming a tangent "T" at an end point 436 of an interface 440 where the interlayer 404 and the FGL 406 meet, and the angle $\theta_2$ is between the tangent "T" and the interface 440. The end point 436 may be located on the surface 432. FIG. 4C shows that the first layer 402 is an FGL, the second layer 404 is an interlayer and the third layer 406 is a reference layer. Again the angle $\theta_2$ is between the tangent "T" formed at the end point 436 of the interface 440 where the interlayer 404 and the FGL 402 meet and the interface 440.

Figure 5A:
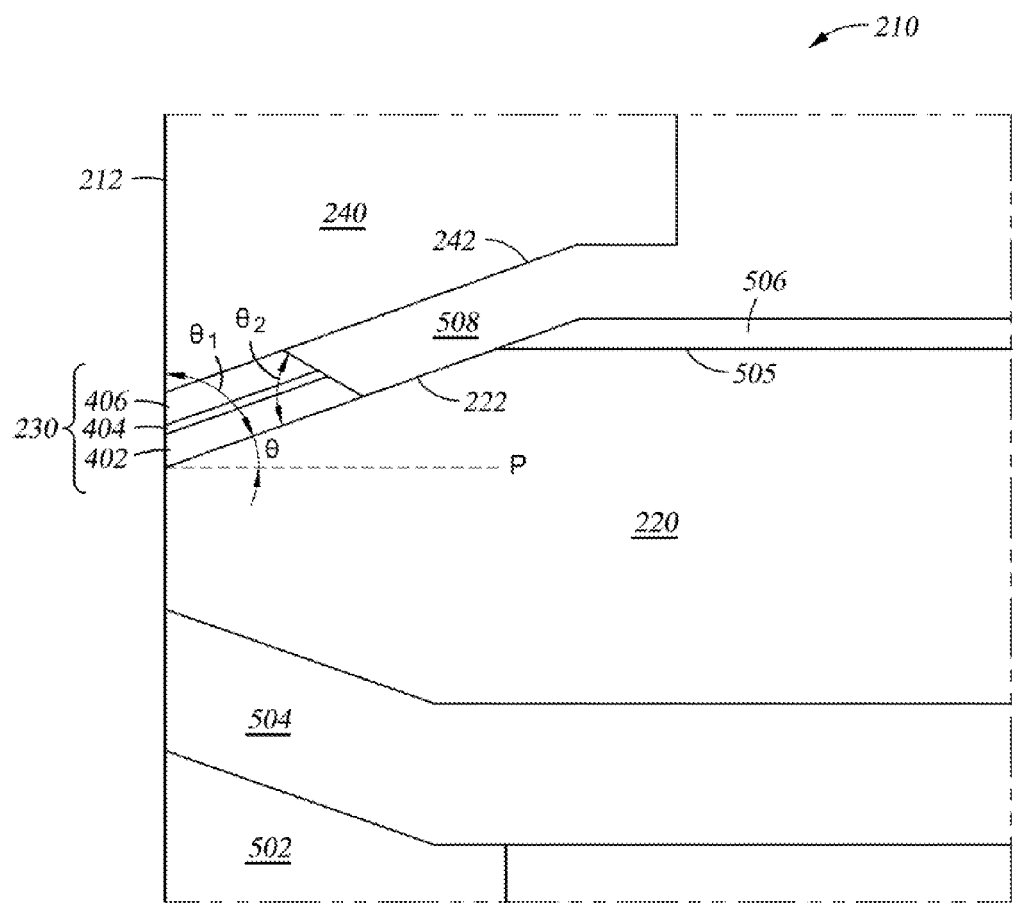
FIGS. 5A-5C are cross sectional views of a portion of a write head at a media facing surface according to various embodiments described herein.
Figure 5B:
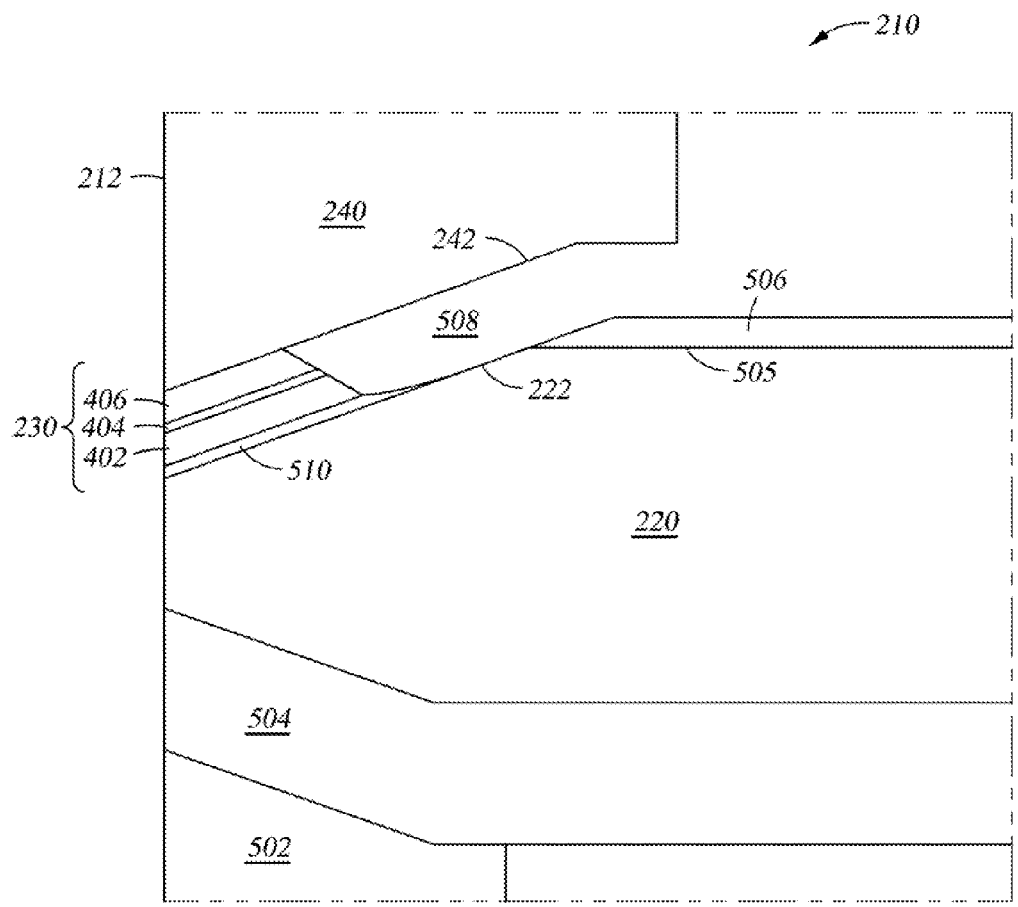
Figure 5C:
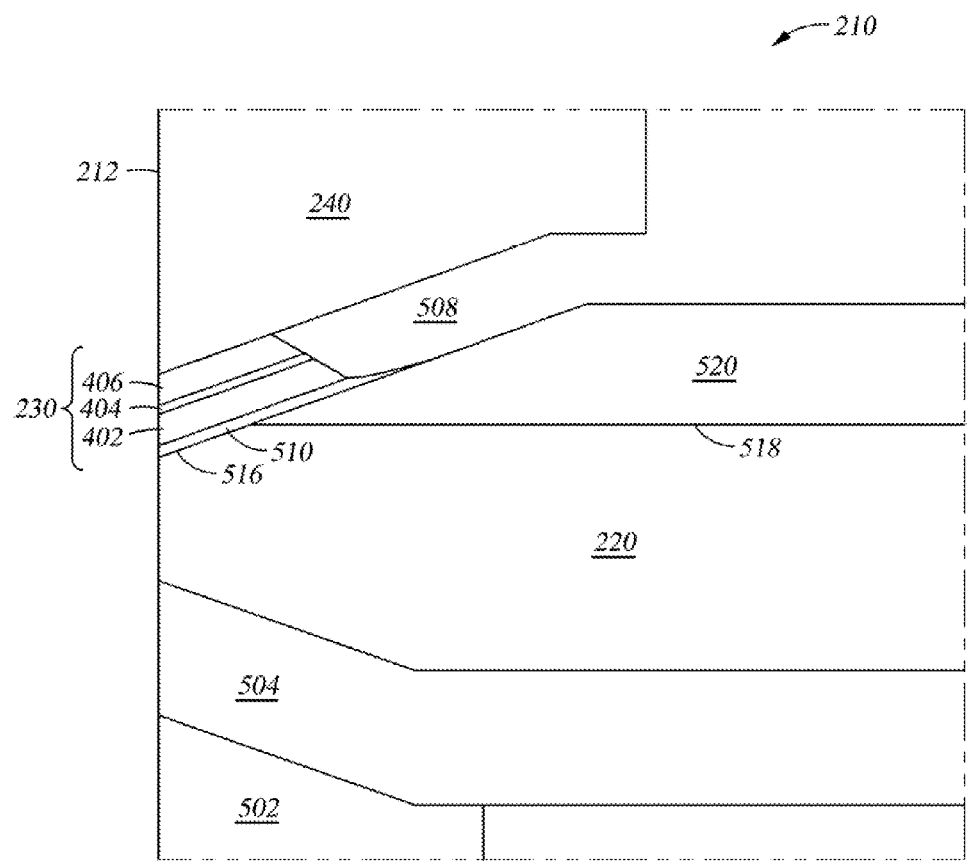

FIGS. 5A-5C are cross sectional views of a portion of the write head 210 at the media facing surface 212 according to various embodiments described herein. As shown in FIG. 5A, the write head 210 includes a leading shield 502 and a leading gap 504 disposed on the leading shield 502. The main pole 220 may be disposed on the leading gap 504. The trailing surface 222 may be connected to a side surface 505 that is substantially parallel to the plane "P." The side surface 505 extends away from the media facing surface 212 and a metallic non-magnetic layer 506 may be disposed on the side surface 505 of the main pole 220. The metallic non-magnetic layer 506 may be chrome or nickel chrome allow. The STO 230 may be disposed over the main pole 220 and the trailing shield may be disposed over the STO 230. A trailing gap 508 may be disposed adjacent to the STO 230 on the tapered trailing surface 222 and the surface 506. Both the leading and trailing gaps 504, 508 may be made of an insulative material, such as alumina.

FIG. 5B shows an underlayer 510 that is disposed between the STO 230 and the tapered trailing surface 222. The underlayer 510 may be a non-magnetic material such as tantalum or platinum. The underlayer 510 is disposed on the tapered trailing surface 222 to protect the main pole 220 from the one or more removal processes used to form the STO 230. One of the one or more removal processes is ion milling. The underlayer 510 may have a flare at an end opposite the media facing surface 212, as a result of the ion milling process. Without the underlayer 510, the tapered trailing surface 222 of the main pole 220 may be gouged.

FIG. 5C shows the main pole 220 having a tapered trailing surface 516 that has a smaller side than that of the tapered trailing surface 222. The STO 230 and the underlayer 510 may be disposed over a portion of a side surface 518 that is connected to the tapered trailing surface 516. A metallic non-magnetic layer 520 may be disposed on the side surface 518, and a portion of the metallic non-magnetic layer 520 may be between the underlayer 510 and the main pole 220. The metallic non-magnetic layer 520 may be made of the same material as the metallic non-magnetic layer 506. The electrical current driving the STO 230 may flow from the main pole 220 to the STO 230 through the metallic non-magnetic layer 520.

In summary, a MAMR enabled magnetic head is disclosed. The MAMR head includes an STO disposed between a main pole and a trailing shield. The STO has a first surface at a media facing surface, a second surface that is opposite the first surface and a third surface adjacent to the first and second surfaces. The acute angle formed by the first and third surfaces is greater than or equal to the acute angle formed by the second and third surfaces. In this configuration, the electrical current going through the STO is substantially perpendicular to the STO, which causes the spin torque to be maximized.

While the foregoing is directed to exemplary embodiments, other and further embodiments of the invention may be devised without departing from the basic scope thereof, and the scope thereof is determined by the claims that follow.

What is claimed is:

1. A microwave assisted magnetic recording head, comprising:
    a spin torque oscillator, wherein the spin torque oscillator includes:
        a first surface at a media facing surface;
        a second surface opposite the first surface; and
        a third surface adjacent to the first and second surfaces, wherein the third surface and the first surface form a first acute angle and the third surface and the second surface form a second acute angle, and wherein the second acute angle is less than or equal to the first acute angle.

2. The microwave assisted magnetic recording head of claim 1, further comprising:
   a main pole, wherein the spin torque oscillator is disposed over the main pole; and
   a trailing shield, wherein the trailing shield is disposed over the spin torque oscillator.

3. The microwave assisted magnetic recording head of claim 2, wherein the spin torque oscillator further includes a reference layer, an interlayer and a field generation layer.

4. The microwave assisted magnetic recording head of claim 3, wherein the reference layer and the field generation layer comprise a magnetic material and the interlayer comprises a non-magnetic material.

5. The microwave assisted magnetic recording head of claim 3, wherein the reference layer is disposed over the main pole, the interlayer is disposed over the reference layer and the field generation layer is disposed over the interlayer.

6. The microwave assisted magnetic recording head of claim 2, wherein the main pole includes a tapered trailing surface and a side surface, wherein the tapered trailing surface forms a third angle with a plane that is perpendicular to the media facing surface.

7. The microwave assisted magnetic recording head of claim 6, wherein the third angle plus the first angle is about 90 degrees.

8. The microwave assisted magnetic recording head of claim 6, further comprising an underlayer disposed over the tapered trailing shield, wherein the spin torque oscillator is disposed over the underlayer.

9. The microwave assisted magnetic recording head of claim 6, further comprising a non-magnetic layer disposed on the side surface.

10. The microwave assisted magnetic recording head of claim 9, wherein the underlayer is disposed over a portion of the non-magnetic layer.

11. A microwave assisted magnetic recording head, comprising:
   a spin torque oscillator, wherein the spin torque oscillator includes:
      a reference layer having a first surface at a media facing surface, a second surface opposite the first surface, and a third surface adjacent to the first and second surfaces, wherein the first surface and the third surface forms a first angle;
      an interlayer having a fourth surface at the media facing surface and a fifth surface opposite the fourth surface; and
      a field generation layer disposed adjacent to the interlayer, wherein
   the field generation layer has a sixth surface disposed at the media facing surface and a seventh surface opposite the fifth surface, wherein the second, fifth and seventh surfaces together have a curvature.

12. The microwave assisted magnetic recording head of claim 11, further comprising an interface where the interlayer and the field generation layer meet, wherein a second angle is formed between the interface and a tangent to an end point of the interface located on the fifth surface, and wherein the second angle is less than or equal to the first angle.

13. The microwave assisted magnetic recording head of claim 12, further comprising:
   a main pole, wherein the spin torque oscillator is disposed over the main pole; and
   a trailing shield, wherein the trailing shield is disposed over the spin torque oscillator.

14. The microwave assisted magnetic recording head of claim 13, wherein the main pole includes a tapered trailing surface and a side surface, wherein the tapered trailing surface forms a third angle with a plane that is perpendicular to the media facing surface.

15. The microwave assisted magnetic recording head of claim 14, wherein the third angle plus the first angle is about 90 degrees.

16. The microwave assisted magnetic recording head of claim 14, further comprising an underlayer disposed over the tapered trailing shield, wherein the spin torque oscillator is disposed over the underlayer.

17. The microwave assisted magnetic recording head of claim 14, further comprising a non-magnetic layer disposed on the side surface.

18. A hard disk drive, comprising:
   a magnetic media;
   a magnetic read head; and
   a magnetic write head, wherein the magnetic read head and the magnetic write head include a media facing surface, and the magnetic write head further includes a spin torque oscillator, wherein the spin torque oscillator has:
      a first surface at the media facing surface;
      a second surface opposite the first surface; and
      a third surface adjacent to the first and second surfaces, wherein the third surface and the first surface form a first acute angle and the third surface and the second surface form a second acute angle, and wherein the second acute angle is less than or equal to the first acute angle.

19. The hard disk drive of claim 18, wherein the magnetic write head further comprising:
   a main pole, wherein the spin torque oscillator is disposed over the main pole; and
   a trailing shield, wherein the trailing shield is disposed over the spin torque oscillator.

20. The hard disk drive of claim 19, wherein the main pole includes a tapered trailing surface and a side surface, wherein the tapered trailing surface forms a third angle with a plane that is perpendicular to the media facing surface.

* * * * *